United States Patent [19]
Nakamura et al.

[11] 4,192,154
[45] Mar. 11, 1980

[54] CONSTANT VELOCITY UNIVERSAL JOINT

[75] Inventors: Yozo Nakamura; Morio Ohshina, both of Shimoinayoshi, Japan

[73] Assignee: Hitachi Construction Machinery Co., Ltd., Japan

[21] Appl. No.: 844,122

[22] Filed: Oct. 20, 1977

[30] Foreign Application Priority Data

Oct. 27, 1976 [JP] Japan .................. 51-128381

[51] Int. Cl.$^2$ .................................................. F16D 3/30
[52] U.S. Cl. .................................... 64/21; 64/17 R; 64/23
[58] Field of Search ................ 64/21, 8, 17 R, 23

[56] References Cited

U.S. PATENT DOCUMENTS

| | | | |
|---|---|---|---|
| 3,076,322 | 2/1963 | Wildhaber | 64/21 |
| 3,522,714 | 8/1970 | Wildhaber | 64/21 |
| 3,818,721 | 6/1974 | Wahlmark | 64/21 |
| 3,877,251 | 4/1975 | Wahlmark | 64/21 |
| 3,930,378 | 1/1976 | Schmid | 64/21 |

*Primary Examiner*—Charles J. Myhre
*Assistant Examiner*—R. C. Turner
*Attorney, Agent, or Firm*—Craig and Antonelli

[57] ABSTRACT

A constant velocity universal joint of the three-roller type, capable of exactly transmitting power at constant velocity, comprises two drive members, one of which includes three yoke pins with respective roller means. Each roller means comprises an inner movable member adapted to rotate about the axis of the associated yoke pin and move axially of the pin, and an outer movable member disposed outside of the inner movable member and tiltable with respect to the rotational axis of the inner movable member. The other drive member includes guide grooves for guiding the outer movable members of the roller means along the rotational axis of the drive member itself.

10 Claims, 13 Drawing Figures

CONSTANT VELOCITY UNIVERSAL JOINT

LIST OF PRIOR ART REFERRENCES (37 CFR 1.56 (a))

The following references are cited to show the state of the art:

U.S. Pat. No. 3,818,721 Wahlmark June 25, 1974 64-21

U.S. Pat. No. 3,125,870 Orain Mar. 24, 1964 64-7.

BACKGROUND OF THE INVENTION

This invention relates to a three-roller type constant velocity universal joint, and more specifically to such a joint in which three drive rollers are carried by yoke pins on one of two drive members and are engaged with respective guide grooves formed in the other drive member to provide constant velocity universal drive and permit the two drive members to be angularly tilted with respect to each other.

Constant velocity universal joints to the three roller type are described in the literature, for example, in U.S. Pat. No. 3,125,870. Typically, a joint of the type comprises one drive member with three yoke pins and three rollers rotatable about the axes of, and movable axially of, the respective yoke pins, and the other drive member with three guide grooves engaged with the three rollers.

The universal joint of the construction described operates in the following way. As one drive member is tilted with respect to the other while power is being transmitted through the joint, the yoke pins of one drive member are tilted, too, within the other drive member. Accordingly, the rollers on the respective yoke pins rotate around the pins and, guided by the guide grooves in the other drive member, move rectilinearly in parallel with the rotational axis of the other drive member while, at the same time, inclining and sliding in the guide grooves under the urgings of the yoke pins tilted by the angular shifting of the two drive members relative to each other.

In the foregoing operation, the repetition of relative angular shifting of the two drive members causes the rollers to continue simultaneously a combined motion, or a combination of their rolling motion in engagement with the guide grooves and their skew sliding motion in engagement with the grooves that results from their linear travel in the grooves and from the tilt of the yoke pins. This combined motion is so rigorous for the guide grooves as well as for the rollers that it hastens their surface fatigue. In addition, the skew sliding motion relative to the guide grooves causes the rollers to deviate in their contact with the yoke pins. These unfavorable conditions bring a number of disadvantages, including reduced strength and shortened life of the rollers and yoke pins.

Another prior art universal joint of the type is disclosed in U.S. Pat. No. 3,818,721. The joint carries rollers rotatably on trunnions, or yoke pins, by means of self-aligning bearings so that the rollers are restrained from their movement axially of the yoke pins while their rotation around, and tilting relative to, the yoke pins are permitted. In the patented joint the rollers cannot move axially of the yoke pins, and therefore they move within drive channels or tracks, or guide grooves, with arcuate loci. Consequently, the peripheral speed on the outer periphery of each roller is greater than that on the inner periphery, and the roller performs both rolling and sliding motions with respect to the associated guide groove. As a result, the rollers and guide grooves tend to suffer from premature surface fatigue under conditions as severe as with the joint of the abovementioned U.S. Pat. No. 3,125,870.

SUMMARY OF THE INVENTION

It is an object of the present invention to provide a constant velocity universal joint capable of exact constant velocity power transmission.

Another object of the invention is to provide a constant velocity universal joint with improvements in the load-carrying capacity, speed of rotation to be transmitted, and transmission efficiency.

Yet another object of the invention is to provide a constant velocity universal joint in which the usually combined rolling and sliding motion of the rollers is divided into actions independent of each other so as to protect the rollers against the severe motions and to prevent deviational contact between the rollers and yoke pins.

According to this invention, these objects are realized by a three-roller type constant velocity universal joint comprising a first drive member connected to one of two shafts, a second drive member connected to the other shaft, three yoke pins secured to the first drive member in equally spaced relation around, and radially of the axis of the drive member, three inner movable members carried by the respective yoke pins to be slidable axially of, and rotatable around, the pins, and three outer movable members disposed respectively outside of the inner movable members to rotate, tilt and rock along the outer peripheries of the inner members, said second drive member including guide grooves which have opposing side walls along which the outer movable members can be guided in parallel with the rotational axis of the second member.

Other objects, advantages and features of the present invention will become apparent from the following description taken in connection with the accompanying drawings.

DETAILED DESCRIPTION

Figure 1:
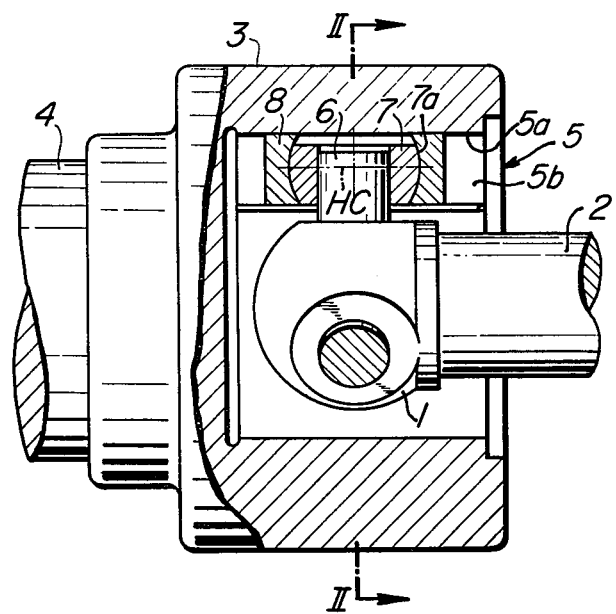
FIG. 1 is a front elevational view, partly in section, of a constant velocity universal joint embodying the invention.
Figure 3:
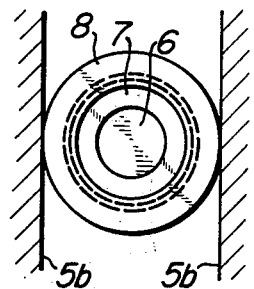
FIG. 3 is a sectional view taken on line III—III of FIG. 2.
Figure 2:
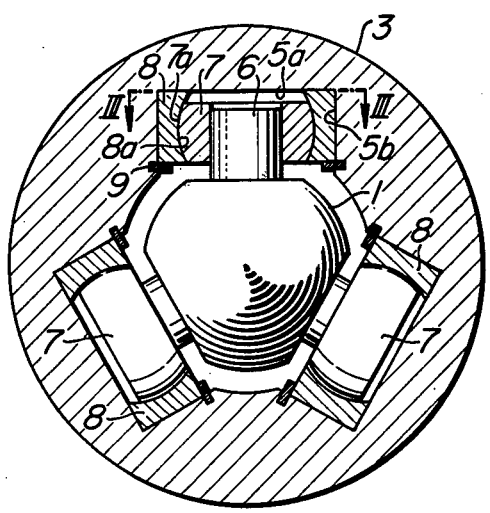
FIG. 2 is a transverse sectional view taken on line II—II of FIG. 1.

Referring now to FIGS. 1 to 3, there is shown an embodiment of the constant velocity universal joint of the invention. In these figures, a first drive member 1 is shown formed in one piece with a shaft 2, and a second drive member 3, with another shaft 4. The second drive member 3 includes three guide grooves 5 formed in the surrounding wall of its center cavity. The guide grooves 5 extend parallelly with the axis of the shaft 4 and are circumferentially spaced 120 deg. apart from one another. Each of the guide grooves 5 comprises a bottom wall 5a for restricting the radial shifting of the associated movable member (to be described later) with respect to the shaft 4, and two opposing side walls 5b for guiding the movable member in its travel in parallel with the axis of the shaft 4. These guide grooves 5 can be easily formed by broaching or other machining operation.

On the periphery of the first drive member 1, three yoke pins 6 extend radially from the rotational axis of the first drive member 1 toward the respective guide grooves 5 and are circumferentially spaced 120 deg. apart from one another. Each of the yoke pins 6 carries an annular, inner movable member 7 which rotates on, and slides axially of, the pin. The outside peripheral surface of the movable member 7, which is partly cut away parallel to its horizontal centerline and forms a segmental spherical surface 7a asymmetrical with respect to the horizontal centerline HC normal to the axis of the associated pin. The asymmetrical, segmental spherical surface 7a is formed on the inner movable member 7, largely because the relative angular shifting of the axes of both drive members is limited and also because such a peripheral surface permits the second drive member 3 to have an accordingly reduced outside diameter.

Each of the inner movable members 7 is surrounded by an annular, outer movable member 8 having an inside wall with a segmental spherical surface 8a mating with the spherical surface 7a of the inner member. This construction enables the outer movable member 8 to rotate with respect to the inner movable member 7 and, at the same time, tilt relative to the rotational axis of the inner member. The outside peripheral surface of the outer movable member 8 is cylindrically shaped as shown in FIG. 3. With this cylindrical outside surface the outer movable member is fitted in the guide groove 5 for a genuine rolling motion between the side walls 5b of the groove. The inner end of the outer movable member 8, close to the base end of the associated yoke pin 6, is in contact with stop members 9 incorporated in the second drive member 3.

The inner movable member 7 may be placed inside the outer movable member 8 in any suitable way. One method consists of forming an opposing pair of recesses in one end portion of the inside spherical surface of the outer movable member 8, introducing the inner member into the outer member, with its axis at right angles to the axis of the outer member, through the recesses, and then turning the inner member through an angle of 90 deg. within the outer member. In this manner the inner movable member 7 can be movably held inside the outer movable member 8.

Next, the operation of the afore-described embodiment of constant velocity universal joint according to the invention will be described.

Figure 4:
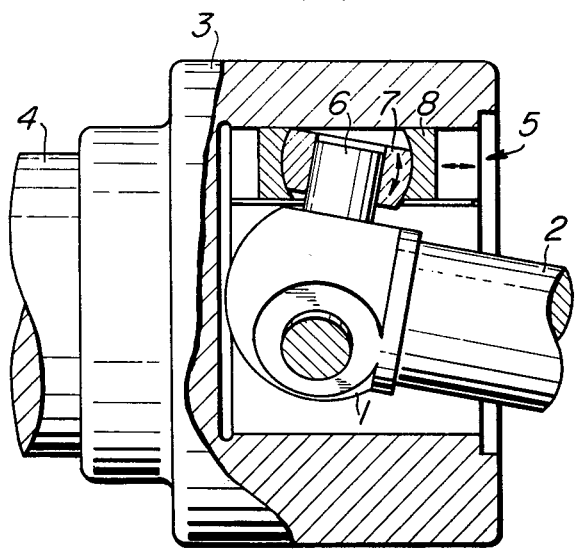
FIG. 4 is a view similar to FIG. 1 but showing the joint tilted in operation.

As the shaft 2 is tilted with respect to the shaft 4 and the latter shaft is driven as shown in FIG. 4, each outer movable member 8 is centrifugally urged along the bottom wall 5a of the guide groove 5 and, guided by the side walls 5b of the groove, it performs a genuine rolling motion between the side walls 5b. On the other hand, the inner movable member 7 associated with the outer member slides axially of the yoke pin 6 while being guided by the same pin. At the same time, it rotates around the yoke pin 6 to bear part of the rotating motion that results from the rolling motion of the outer movable member 8. Also, the contacting spherical surfaces on the inner periphery of the outer movable member 8 and on the outer periphery of the inner movable member 7 smoothly accommodate the angular difference between the yoke pin 6 and the guide groove 5 while in rotating motion to bear part of the rotating motion that results from the rolling motion of the outer movable member 8. Thus, the contacting spherical surfaces of the inner and outer movable members 7, 8 can be provided mainly for the sliding motion independently of the rolling motion for which the outer movable member 8 and the guide groove 5 are mostly responsible. The division of work lessens the burden on the inner movable member 7 and the yoke pin 6 and makes them more durable with less surface fatigue than the conventional components.

Figure 5:
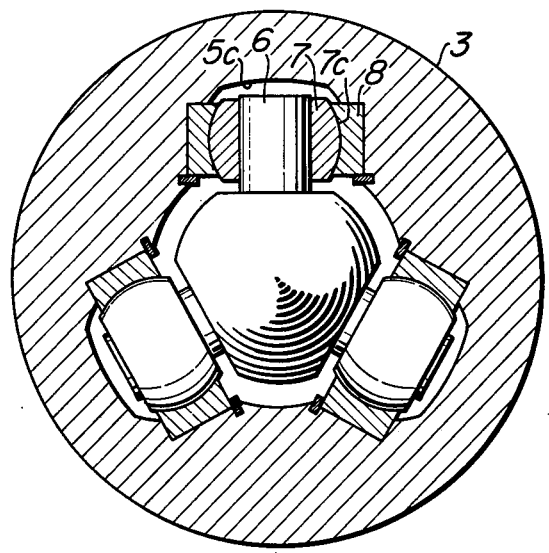
FIG. 5 is a transverse sectional view of a modified form of inner movable members in the constant velocity universal joint according to the invention.

While the outer periphery of each inner movable member 7 in the joint illustrated in FIGS. 1 to 3 takes the form of an asymmetrical, segmental spherical surface, it may be replace by a symmetrical, segmental spherical surface 7c as shown in FIG. 5 when an increased outside diameter of the second drive member 3 offers no problem. In the latter case, the bottom wall 5a of the guide groove 5 must be lowered to further provide a relief space 5c in order to avoid the mutual interference of the radially outer end of the yoke pin 6, inner movable member 7 and the bottom wall 5a.

Figure 6:
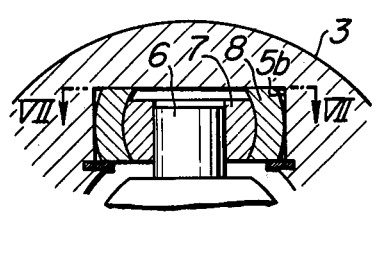
FIG. 6 is a fragmentary transverse sectional view of a second embodiment of the constant velocity universal joint of the invention, showing the structure in which each guide groove and the associated outer movable member are engaged.
Figure 7:
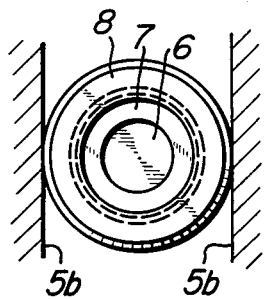
FIG. 7 is a sectional view taken on line VII—VII of FIG. 6.

FIGS. 6 and 7 illustrate a second embodiment of the structure in which each outer movable member 8 and the associated guide groove 5 of the joint according to the invention are engaged the side walls 5b of each guide groove 5 being formed with flat surfaces. In this second embodiment the outside peripheral surface of the annular, outer movable member 8 is also of a segmental spherical contour. This feature, which distinguishes the embodiment from the first one shown in FIGS. 1 to 3, improves the adaptability of the outer movable member 8 for genuine rolling engagement with the guide groove 5.

Figure 8:
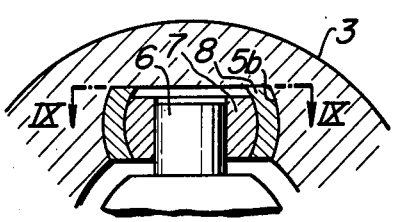
FIG. 8 is a fragmentary transverse sectional view of a third embodiment of the invention, showing the structure in which each guide groove and the associated outer movable member are engaged.
Figure 9:
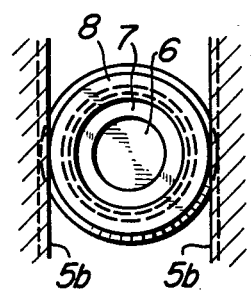
FIG. 9 is a sectional view taken on line IX—IX of FIG. 8.

A third embodiment of the joint of the invention is illustrated in FIGS. 8 and 9. This embodiment features circular arc surfaces for contact both on the outer periphery of each annular, outer movable member 8 and on the side walls 5b of the associated guide groove 5. In this embodiment the outer movable member 8 can engage the groove 5 for a genuine rolling motion in the same way as in the immediately preceding embodiment. An additional advantage is that the stop members 9 are not required and the total number of components is decreased accordingly.

The both embodiments shown in FIGS. 6 and 8, wherein each outer movable member 8 performs a genuine rolling motion between the guide groove 5 and the outer movable member, may be modified, depending upon the lubricating, load carrying and other conditions, so that the outer movable member 8 can be imparted with a genuine sliding motion relative to the guide groove 5. This is accomplished by a fourth embodiment illustrated in FIGS. 10 and 11 and also by a fifth embodiment in FIGS. 12 and 13.

Figure 10:
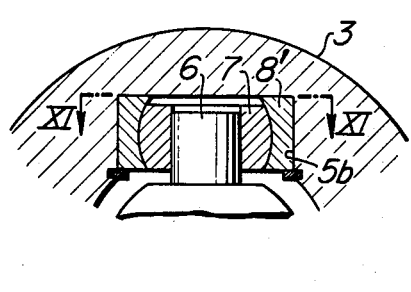
FIG. 10 is a fragmentary transverse sectional view of a fourth embodiment of the invention, showing the structure in which each guide groove and the associated outer movable member are engaged.
Figure 11:
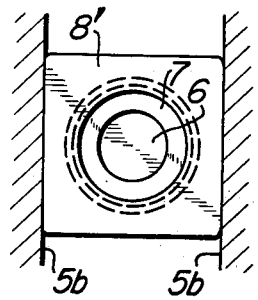
FIG. 11 is a sectional view taken on line XI—XI of FIG. 10.

The fourth embodiment of the invention shown in FIGS. 10 and 11 includes guide grooves 5 each of which has side walls 5b with flat surfaces, and outer movable member 8' each of which has flat mating sides, too. These flat surfaces engage to make it possible for the outer movable members 8' to perform a genuine sliding motion relative to the guide grooves. Although the both mating surfaces are flat in this embodiment, either the side walls of the grooves or those of the outer members may take the form of ribs instead.

Figure 12:
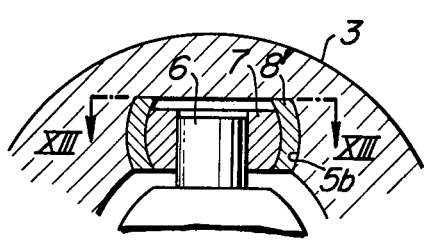
FIG. 12 is a fragmentary transverse sectional view of a fifth embodiment of the invention, showing the structure in which each guide groove and the associated outer movable member are engaged.
Figure 13:
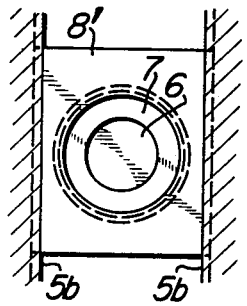
FIG. 13 is a sectional view taken on line XIII—XIII of FIG. 13.

In the fifth embodiment shown in FIGS. 12 and 13, the side walls 5b of each guide groove 5 have circular arc surfaces, and the mating sides of each outer movable member 8' have circular arc ribs to engage the side walls 5b. These side walls and ribs in engagement permit a genuine sliding motion of each outer movable member 8' with respect to the associated guide groove. This structure eliminates the necessity of the stop members 9, and thereby reduces the number of components required.

As has been described in detail, the constant velocity universal joint of the invention uses completely independent mechanical components to accommodate the rolling motion and sliding motion which occur simultaneously between each roller member and the associated guide groove of the prior art joints. Thus, the roller members are protected from excessive motions, and the possibility of deviational contact between the yoke pins and movable members is minimized. As a consequence, a film of fluid lubricant is readily formed on all contacting parts, enabling the joint to run at high speeds with an increased load-carrying capacity. Moreover, the constant velocity universal joint of the invention achieves an enhanced power transmission efficiency with a minimum of power loss because, as above noted, a film of fluid lubricant can be easily formed on its contacting parts and also because the rotational motion resulting from the rolling motion of the outer movable members can be accommodated by two separate regions, i.e., between the yoke pins and the inner movable members and between the inner and outer movable members.

What is claimed is:

1. A three-roller type constant velocity universal joint, comprising a first drive member connected to a first shaft, a second drive member connected to a second shaft, three radial yoke pins secured to said first drive member offset with respect to each other at equal angles, three inner movable members secured to said yoke pins and axial guide grooves in said second drive member, characterized in that said inner movable members are annular rollers, axially movable on said yoke pins, that three outer movable members are disposed on said inner movable members to rotate and tilt with outer peripheries of the outer movable members guided in the guide grooves in parallel with the rotational axis of said second drive member, and that an outside peripheral surface of said annular roller and an inside peripheral surface of said outer movable member mate and are both of segmental spherical contours and accommodate the tilting of the rotational axis of said inner movable member.

2. A universal joint according to claim 1, characterized in that said outer movable member has an outside peripheral surface adapted for rolling motion in said guide grooves.

3. A universal joint according to claim 2, characterized in that said outer movable member has a cylindrical outside surface that is guided by the guide groove with flat surfaces.

4. A universal joint according to claim 2, characterized in that said outer movable member has a segmental spherical surface that is guided by the guide groove with flat surfaces.

5. A universal joint according to claim 2, characterized in that said outer movable member has a segmental spherical surface that is guided by the guide groove with segmental spherical surfaces.

6. A constant velocity universal joint comprising:
(a) a first rotatable shaft;
(b) a first drive member connected to said first shaft;
(c) three yoke pins extending radially from said first shaft and spaced at equal angles with respect to each other;
(d) three inner movable members, each inner movable member being a roller with an outer segmental spherical contour and supported on a respective yoke pin for both axial travel therealong and rotational movement thereabout;
(e) a second shaft rotatable about an axis;
(f) a second drive member connected to said second shaft, said second drive member being provided with three axial guide grooves extending parallel to said axis; and
(g) three outer movable members, each constrained to movement along a respective one of said grooves parallel to said axis and being provided with an inner segmental spherical contour in mating contact with the outer segmental spherical contour of said rollers for enabling relative rotational and tilting sliding movement between said inner and outer movable members.

7. A constant velocity universal joint according to claim 6, wherein each said outer movable member has an outside peripheral surface adapted for genuine sliding engagement with the associated guide groove of said second drive member.

8. A universal joint according to claim 6, wherein said outer movable members comprise rollers for performing genuine rolling movement relative to side walls of said guide grooves, said rolling movement; and said sliding movement being achievable separately of one another.

9. A universal joint according to claim 8, wherein the outer segmental spherical contour of said inner movable members are asymmetric.

10. A universal joint according to claim 8, wherein the rollers of said outer movable members have a cylindrical outer peripheral contour, and said sidewalls are planar.

* * * * *